United States Patent
Do

(10) Patent No.: US 10,494,000 B2
(45) Date of Patent: Dec. 3, 2019

(54) FAIRING FOR AN ARTICULATED RAILWAY VEHICLE BOGIE AND ARTICULATED RAILWAY VEHICLE COMPRISING A BOGIE PROVIDED WITH SUCH A FAIRING

(71) Applicant: ALSTOM TRANSPORT TECHNOLOGIES, Saint-Ouen (FR)

(72) Inventor: Huu-Thi Do, Rochefort (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 232 days.

(21) Appl. No.: 15/455,224

(22) Filed: Mar. 10, 2017

(65) Prior Publication Data

US 2017/0274912 A1 Sep. 28, 2017

(30) Foreign Application Priority Data

Mar. 24, 2016 (FR) ..................................... 16 52538

(51) Int. Cl.
*B61F 3/14* (2006.01)
*B61F 3/12* (2006.01)
*B61D 17/02* (2006.01)

(52) U.S. Cl.
CPC ............... *B61F 3/14* (2013.01); *B61D 17/02* (2013.01); *B61F 3/125* (2013.01); *Y02T 30/32* (2013.01)

(58) Field of Classification Search
CPC ...... B61F 1/00; B61F 3/00; B61F 3/12; B61F 3/14; B61F 13/00; B61D 17/20
See application file for complete search history.

(56) References Cited

U.S. PATENT DOCUMENTS 8,479,658 B2 * 7/2013 Langerwisch ......... B61D 17/02
105/1.1

FOREIGN PATENT DOCUMENTS

| DE | 726 181 C | 10/1942 |
|---|---|---|
| DE | 10 2010 061 718 A1 | 5/2012 |
| EP | 0 057 765 A1 | 8/1982 |
| JP | H09-226561 A | 9/1997 |
| WO | 2010/086201 A1 | 8/2010 |
| WO | 2014/206643 A1 | 12/2014 |

OTHER PUBLICATIONS

French Search Report, dated Dec. 2, 2016, from corresponding French application.

* cited by examiner

*Primary Examiner* — Robert J McCarry, Jr.
(74) *Attorney, Agent, or Firm* — Young & Thompson

(57) ABSTRACT

Disclosed is a fairing (3) for an articulated railway vehicle bogie, this fairing including: a bottom wall (30) and side walls (31) able to surround at least a lower part of a bogie, and first and second anchoring zones (51, 52) each able to be fastened to one end, respectively, of a first body and a second body of a railway vehicle that are articulated relative to one another, in a configuration where these first and second bodies rest at least partially on the bogie. The fairing (3) includes a flexible connector (4) that mechanically links the first anchoring zone (51) and the second anchoring zone (52) and that authorizes a movement of these first and second anchoring zones relative to one another.

18 Claims, 4 Drawing Sheets

FAIRING FOR AN ARTICULATED RAILWAY VEHICLE BOGIE AND ARTICULATED RAILWAY VEHICLE COMPRISING A BOGIE PROVIDED WITH SUCH A FAIRING

FIELD OF THE INVENTION

The invention relates to a fairing for an articulated railway vehicle bogie. The invention also relates to an articulated railway vehicle including a bogie provided with such a fairing.

BACKGROUND OF THE INVENTION

Railway vehicles, such as passenger and high-speed trains, are known whereof the bogies are each provided with a fairing, which makes it possible to improve the aerodynamic properties of the vehicle. Each fairing typically includes a bottom wall and side walls, which are generally rigid, and which cover at least a lower part of the bogie with which they are associated. This in particular makes it possible to limit the disruptions to the flow of air circulating below the railway vehicle when the latter travels at a high speed. The operating performance of the vehicle is thus improved.

These known fairings nevertheless have the drawback of not being compatible with articulated railway vehicles in which bogies are situated at articulations, between bodies of this vehicle. This is for example the case for bogies of the Jacobs type. For example, a bogie is situated at an articulation between first and second bodies of the vehicle, such that each of these first and second bodies rests at least partially on the bogie. In this case, the rigidity of the fairing prevents the bodies from moving relative to one another at the articulation when the vehicle moves.

The invention more particularly aims to resolve these drawbacks by proposing a fairing for a bogie of an articulated railway vehicle that is usable with bogies placed at the articulation between the bodies of the railway vehicle.

SUMMARY OF THE INVENTION

To that end, the invention relates to a fairing for bogie of an articulated railway vehicle, this fairing including:
  a bottom wall and side walls able to surround at least a lower part of a bogie, and
  first and second anchoring zones each able to be fastened to one end, respectively, of a first body and a second body of a railway vehicle that are articulated relative to one another, in a configuration where these first and second bodies rest at least partially on the bogie.

The fairing includes a flexible connector that mechanically links the first anchoring zone and the second anchoring zone and that authorizes a movement of these first and second anchoring zones relative to one another.

Owing to the invention, the flexible connector allows the first anchoring zone of the fairing fastened to the first body to move relative to the second anchoring zone of the fairing fastened to the second body of the vehicle. The first and second bodies can move relative to one another, during the operation of the vehicle, without damaging the fairing and without the fairing hindering their movement.

According to advantageous but optional aspects of the invention, such a fairing can incorporate one or more of the following features, considered in any technically allowable combination:

The flexible connector includes an elastomeric material, preferably in the form of a block or strip.

The fairing is fastened to the bogie with no degree of freedom, the first and second anchoring zones are arranged directly on the flexible connector and the flexible connector extends over peripheral portions of the fairing.

The fairing is split between a central portion fastened to the bogie, and first and second peripheral portions, the first and second anchoring zones are arranged on the first and second peripheral portions and the flexible connector extends between the central portion and each of the first and second peripheral portions and connects the central portion to each of the first and second peripheral portions.

The fairing is split into a front portion and a rear portion, the first and second anchoring zones are arranged on the first and second portions and the flexible connector extends between the front and rear portions and connects these front and rear portions to one another.

The fairing is made from a rigid material, such as metal or a composite material or Kevlar.

The fairing includes openings allowing elements of the bogie to pass through.

The flexible connector is fastened to the fairing using through fastening elements, such as bolts.

The flexible connector is fastened to the fairing by gripping, for example using a clamp arranged on the fairing.

According to another aspect, the invention also relates to an articulated railway vehicle including:
  first and second bodies articulated relative to one another,
  a bogie on which the first and second bodies rest at least partially,
  a fairing of the bogie, comprising:
    a bottom wall and side walls surrounding at least a lower part of the bogie, and
    anchoring zones each able to be fastened to one end, respectively, of the first body and the second body, these first and second bodies resting at least partially on the bogie.

The fairing of this vehicle is made according to the invention.

BRIEF DESCRIPTION OF THE DRAWINGS

The invention will be better understood and other advantages thereof will appear more clearly in light of the following description of one embodiment of a fairing for an articulated railway vehicle bogie, provided solely as a non-limiting example and done in reference to the appended drawings, in which.

DETAILED DESCRIPTION OF THE INVENTION

Figure 1:
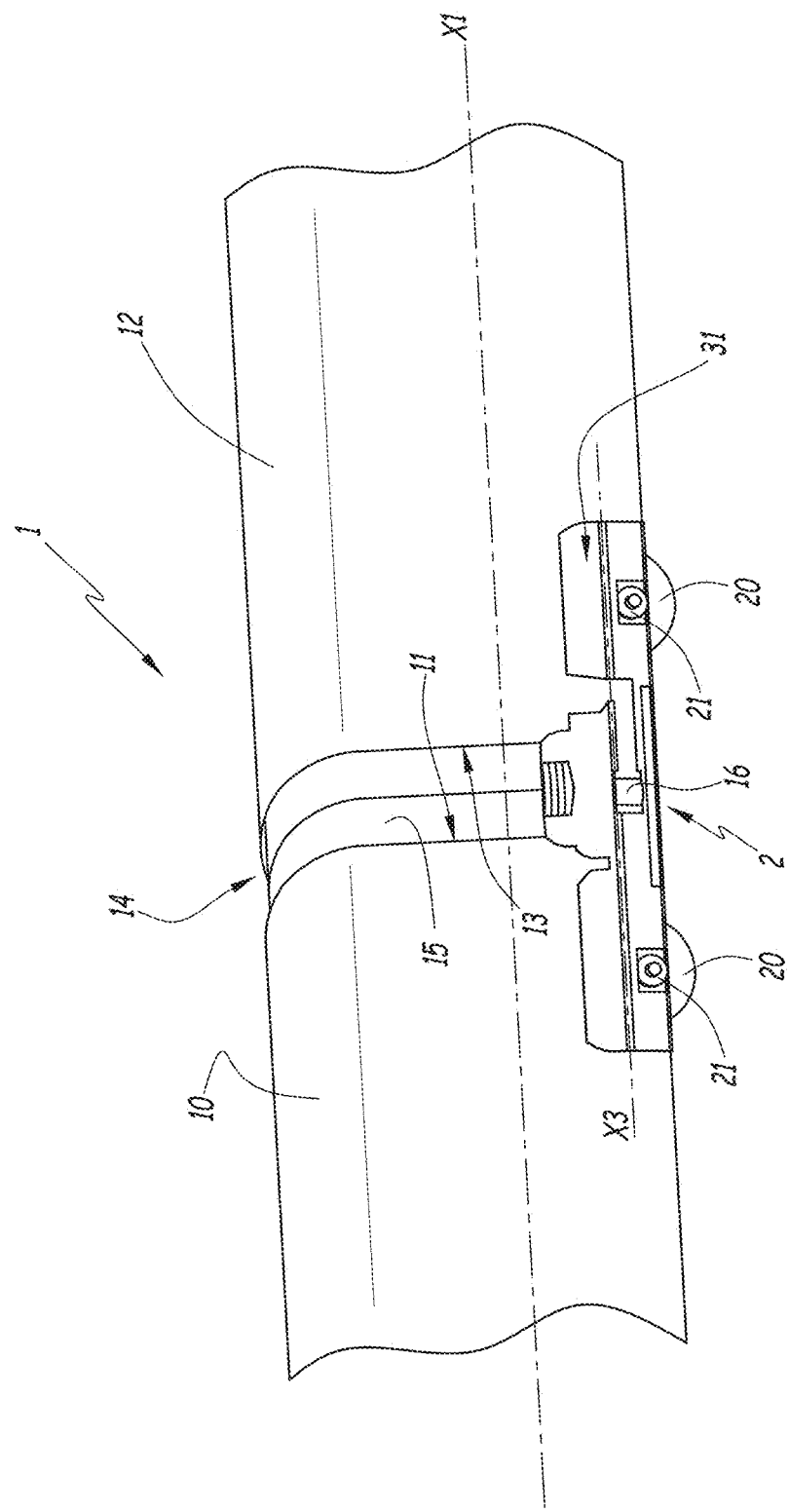
FIG. 1 schematically shows, in perspective view, a portion of an articulated railway vehicle including a bogie provided with a fairing according to the invention.

FIG. 1 shows a partial view of an articulated railway vehicle 1. In this example, this vehicle 1 is a set of wagons of a high-speed train. The vehicle 1 is able to travel on a railroad track, not illustrated, which extends essentially along a horizontal plane.

The vehicle 1 includes a plurality of bodies, articulated relative to one another to form a body of the vehicle 1. These bodies here are able to receive passengers of the vehicle 1 and constitute railway cars if the railway vehicle 1 is a train. These bodies are essentially aligned with one another along a longitudinal axis X1 of the vehicle 1. To simplify FIG. 1, only two bodies 10 and 12 are illustrated. In this description, the terms "front" and "rear" are defined relative to the axis X1.

The bodies 10 and 12 are connected to one another, at terminal ends respectively denoted 11 and 13, by an articulation 14. The respective terminal ends 11 and 13 of the bodies 10 and 12 face one another when the bodies 10 and 12 are mounted articulated on the bogie 2.

The articulation 14 here includes an articulation bellows 15 as well as an articulation mechanism 16.

In a known manner, the articulation bellows 15 places the inside of the bodies 10 and 12 in communication.

The articulation mechanism 16 mechanically links the bodies 10 and 12 and allows them to move relative to one another. The mechanism 16 in particular allows a limited sideways movement of the bodies 10 and 12 in a direction essentially perpendicular to the longitudinal direction and parallel to the plane of the track. The mechanism 16 also allows the bodies 10 and 12 to rotate relative to one another around a rotation axis perpendicular to the longitudinal axis and here extending along an essentially vertical direction.

The vehicle 1 further includes several bogies 2 that each include wheels 20 configured to roll on the railroad track and that are connected to their respective bogie 2 using axles 21. For example, the bogie 2 is of the Jacobs type.

The bogie 2 is fastened to the bodies 10 and 12, for example via the articulation mechanism 16. Here, the body 10 is situated in front of the bogie 2, and the body 12 is situated behind the bogie 2.

In this example, at least part of the bodies 10 and 12 rests on the bogie 2. "At least part of the bodies rests" here means that at least 20%, preferably at least 40%, of the weight of each body 10, 12 is exerted on the bogie 2.

Figure 2:
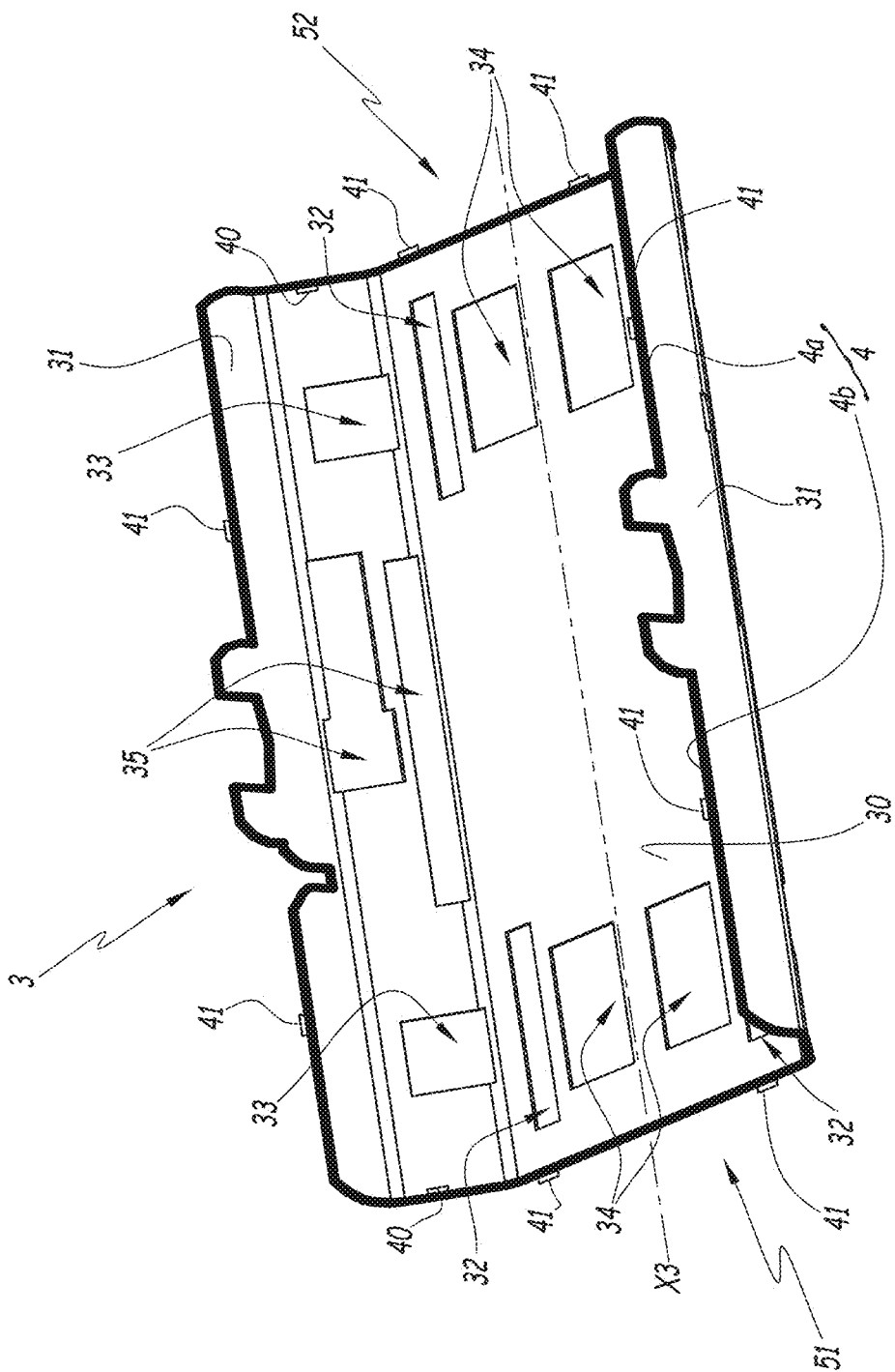
FIGS. 2, 3 and 4 schematically show, in perspective view, a fairing respectively according to first, second and third embodiments of the invention.

The vehicle 1 further includes a fairing 3 protecting the bogie 2. As illustrated in FIG. 2, the fairing 3 includes a bottom wall 30 and side walls 31. The fairing 3 at least partially surrounds a lower part of the bogie 2 when it is in a configuration mounted on the bogie 2.

The bottom wall 30 has an essentially planar shape and extends along a longitudinal axis X3 of the fairing 3. The longitudinal axis X3 is parallel to the longitudinal axis X1 when the fairing 3 is in a configuration mounted on the bogie 2. The bottom wall 30 is configured to be placed below a lower face of the bogie 2. To that end, the bottom wall 30 is provided with openings 32, 34 allowing the passage of wheels 20 and/or other mechanical members of the bogie 2.

The side walls 31 extend essentially vertically upward from the bottom wall 30. The side walls 31 extend longitudinally essentially parallel to the axis X3. Here, the side walls 31 include openings 33 and 35, for example to allow the passage of the ends of the axles 21 or other mechanical members that would protrudes sideways from the bogie 2.

The side walls 31 here are secured with the bottom wall 30 and form a single piece. For example, the fairing 3 has an essentially U-shaped cross-section, this cross-section being defined perpendicular to the longitudinal axis X3 of the fairing 3.

The side walls 31 are advantageously configured to marry the shape of the bottom of the boxes 10 and 12. Preferably, the side walls 31 are also configured to fit in the extension of the outer side walls of the bodies 10 and 12 when the fairing 3 is mounted on the bogie 2. For example, the bodies 10 and 12 include recesses with shapes complementary to those of the walls 31, such that the fairing 3 does not create a significant excess width relative to the bodies 10 and 12 at the articulation, since this would be detrimental to the aerodynamic performance of the vehicle 1.

Preferably, the fairing 3 is made from a rigid material, such as metal. Alternatively, the fairing 3 includes a composite material or Kevlar (registered trademark), or a high-strength glass or a transparent plastic material. Thus, the fairing 3 also plays a mechanically protective role with respect to the bogie 2, for example against ballast projections when the vehicle 1 travels at a high speed.

The fairing 3 further includes anchoring zones 51, 52. The anchoring zone 51 is intended to be fastened on the end 11 of the body 10. The anchoring zone 52 is intended to be fastened to the end 13 of the body 12. Each of the anchoring zones 51 and 52 receives fastening systems 41 that secure the fairing 3 to the bodies 10 and 12, as explained in more detail below.

The fairing 3 further includes a flexible connector 4 that mechanically links the anchoring zone 51 to the anchoring zone 52 and that allows a movement of these anchoring zones 51 and 52 relative to one another, for example when the bodies 10 and 12 move relative to one another owing to the articulation 14. Here, the connector 4 includes an elastomeric material, such as the material used to produce "silent blocks".

"Flexible" means that the connector 4 has a rigidity lower than that of the fairing 3. For example, the Young's modulus of the fairing 3 is 10 times greater, preferably one hundred times greater, still more preferably five hundred times greater than the Young's modulus of the connector 4.

In this example, as illustrated in FIG. 2, the connector 4 assumes the form of two strips 4A and 4B arranged on an outer perimeter of the fairing 3. Here, the strip 4A extends over outer peripheral edges of the side walls 31 and the bottom wall 30 arranged on a rear part of the fairing 3. This rear part of the fairing 3 here is oriented toward the end 13 of the body 12. Similarly, the strip 4B extends along outer edges of the bottom wall 30 and side walls 31 arranged on a front part of the fairing 3. This front part of the fairing 3 here is oriented toward the end 11 of the body 10. Alternatively, the strips 4A and 4B are replaced by a single strip that extends over the entire periphery of the edge of the fairing 3.

The connector 4 is fastened to the fairing by a fastening system 40. For example, the fastening system 40 includes through fastening elements, such as bolts. The material forming the connector 4 is provided with a through hole through which a bolt is inserted fastened on a portion of the fairing 3 bearing a corresponding piercing.

Alternatively, the connector 4 is fastened to the fairing 3 by gripping. For example, the system 40 includes a clamp arranged on the fairing 3 and configured to grip and immobilize the connector 4.

Preferably, the fastening system 40 is reversible and allows the connector 4 to be disassembled relative to the fairing 3, which facilitates the maintenance and/or replacement operations of the fairing 3.

In this example, the bottom wall 30 is fastened directly and with no degree of freedom to the bogie 2, not illustrated in FIG. 2. The anchoring zone 51 is formed by the strip 4B of the connector 4. Similarly, the anchoring zone 52 is formed by the strip 4A of the connector 4. The anchoring zones 51 and 52 here are each provided with a fastening system 41, which fastens them to the bodies 10, 12. This fastening system 41 here is similar to the fastening system 40.

Thus, the connector 4 mechanically links the anchoring zones 51 and 52 indirectly via the bottom wall 30 and the side walls 31.

Figure 3:
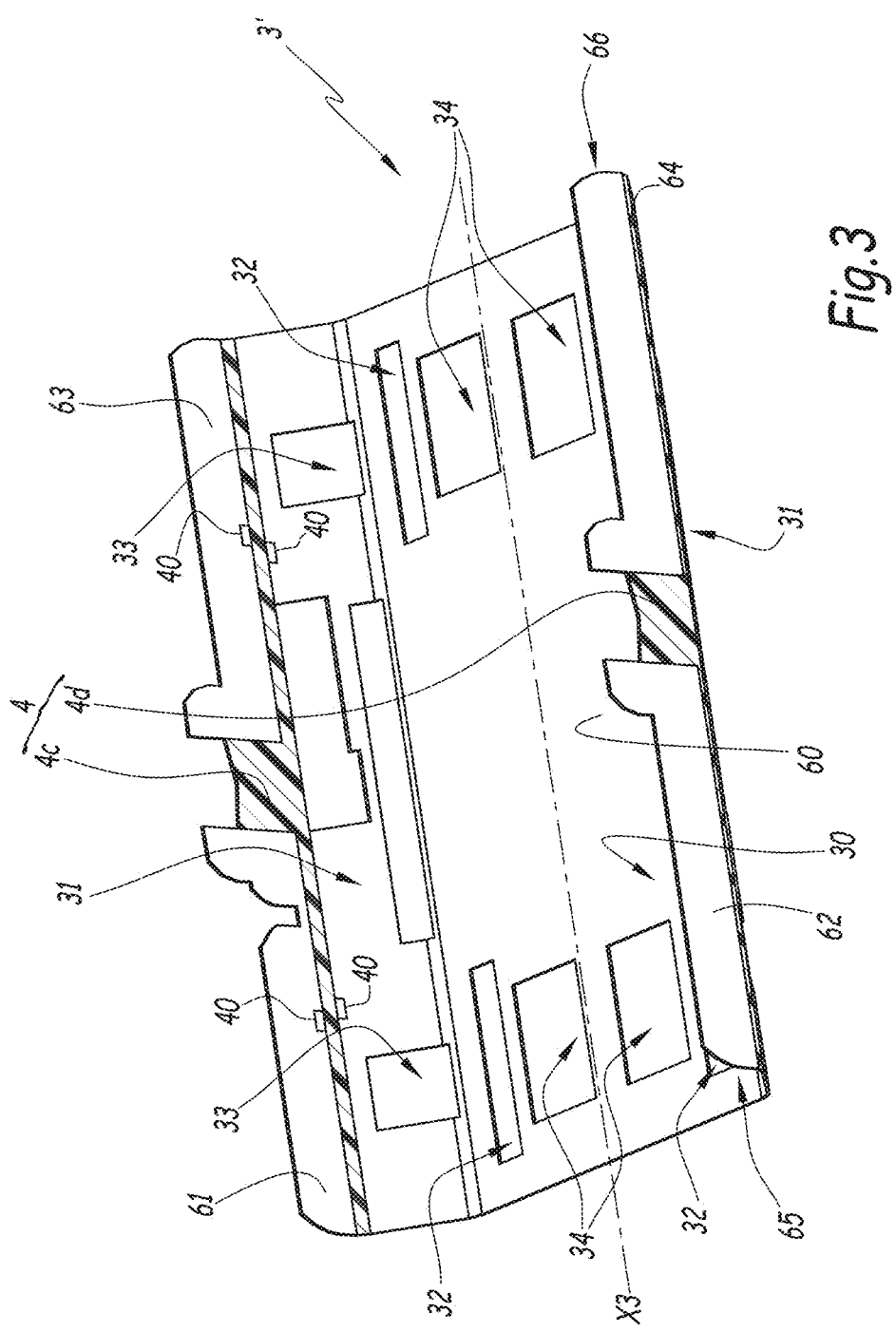
Figure 4:
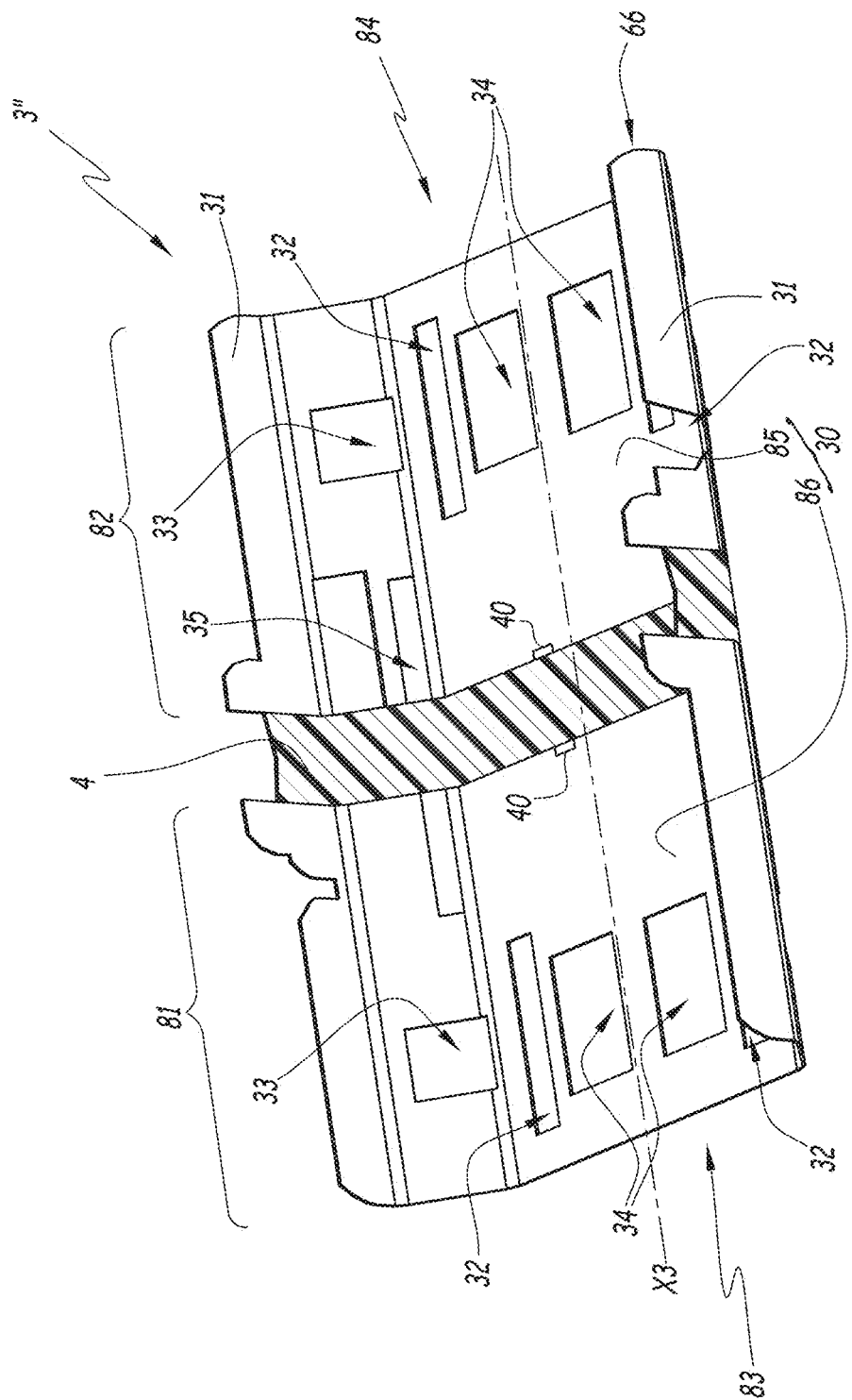

FIGS. 3 and 4 show second and third embodiments of the fairing 3. In these FIGS. 3 and 4, the elements similar to those of the fairing 3 of FIGS. 1 and 2 bear the same references and are not described in more detail.

FIG. 3 shows a fairing 3' according to another embodiment of the invention. The fairing 3' is split between a central portion 60, which is fastened with no degree of freedom to the bogie 2, and peripheral portions 61, 62, 63 and 64. Here, the central portion 60 includes the bottom wall and part of the side walls 31. The peripheral portions 61, 62, 63 and 64 form another part of the side walls 31. More specifically, the peripheral portions 61, 62 are arranged on the side flanks on either side of the bottom wall 30 on a same front side of the fairing 3'. The peripheral portions 61 and 62 each bear an anchoring zone 65 that is turned toward the end 11 of the body 10 to securely fasten these peripheral parts 61 and 62 to the body 10 with no degree of freedom. The anchoring zones 65 play the same role, with respect to the fairing 3', as the anchoring zone 51 of the fairing 3. Here, the anchoring zones 65 are formed by the peripheral portions 61 and 62. The body 10 is therefore fastened to these peripheral portions 61 and 62. The fastening system 41 here is therefore not necessarily identical to the fastening system 40.

Similarly, the peripheral portions 63 and 64 are arranged on either side of the bottom wall 30 and on a rear side of the fairing 3' and are thus opposite the peripheral portions 61 and 62. The peripheral portions 63 and 64 each include an anchoring zone 66 that is turned toward the end 13 of the body 12. The anchoring zones 66 play the same role, with respect to the fairing 3', as the anchoring zone 52 of the fairing 3. Here, the anchoring zones 66 are formed by the peripheral portions 63 and 64.

The front and rear of the fairing 3' here are defined in the same way as for the fairing 3.

The connector 4 here includes a first part 4C, and a second part 4D. The first part 4C links the central portion 60 to the peripheral portions 61 and 63. For example, the part 4C assumes the form of a strip or block that extends longitudinally along one side of the fairing 3' essentially parallel to the axis X3. Likewise, the peripheral portions 62 and 64 are linked to the central portion 60 via the part 4D of the connector 4. Similarly, the connector 4D assumes the form of a strip or block that extends along a side of the fairing 3' opposite the side over which the part 4C extends, essentially parallel to the axis X3.

Alternatively, each part 4C or 4D is split into two separate sub-parts, one connecting only the peripheral part 61 or 62 to the central part 60 and the other connecting only the peripheral portion 63 or 64 to the central portion 60.

FIG. 4 shows a fairing 3" according to another embodiment of the invention. This fairing 3" has a form similar to the fairing 3. More specifically, the fairing 3" is split into front and rear portions 81 and 82, respectively, for example forming two equivalent halves of the fairing 3'. The front and rear of the fairing 3" here are defined in the same way as for the fairing 3.

The connector 4 extends between the portions 81 and 82 along an axis perpendicular to the longitudinal axis X3 and connects these portions to one another. The portions 81 and 82 are each kept at the connector 4 using the fastening system 40. The part 81 includes a bottom wall 86 and the portion 82 includes a bottom wall 85 that together form the bottom wall 30 of the fairing 3". The front portion 81 includes the anchoring zone 83 to the body 10. This anchoring zones 83 play the same role, with respect to the fairing 3", as the anchoring zone 51 with respect to the fairing 3. Similarly, the rear portion 82 includes an anchoring zone 84 to the body 12, this anchoring zones 84 playing the same role, with respect to the fairing 3", as the anchoring zone 52.

The embodiments and alternatives and embodiments considered above may be combined to create new embodiments.

The invention claimed is:

1. A fairing for a bogie of an articulated railway vehicle, comprising:
    a bottom wall comprising a front bottom wall section and a rear bottom wall section;
    first and second side walls able to surround at least a lower part of the bogie, the first and second side walls each comprising a front wall section and a rear wall section, the front and rear wall sections being respectively attached to opposite edges of the front bottom wall section and the rear bottom wall section,
    the front bottom wall section together with the first and second front wall sections defining a front fairing portion,
    the front fairing portion having a front edge and an opposite rear edge that each extend between the first and second front wall sections,
    the rear bottom wall section together with the first and second rear wall sections defining a rear fair portion,
    the rear fairing portion having a front edge and an opposite rear edge that each extend between the first and second rear wall sections,
    the rear edge of the front fairing portion facing the front edge of the rear fairing portion;
    first and second anchoring zones respectively located on the front fairing portion and the second fairing portion,
    each of the first and second anchoring zones being fastenable to one end, respectively, of a first body and a second body of the articulated railway vehicle in a configuration where the first and second bodies rest at least partially on the bogie, the first and second bodies being articulated relative to one another; and
    a flexible connector that mechanically links the first anchoring zone and the second anchoring zone and that authorizes a movement of the first and second anchoring zones relative to one another,
    wherein the flexible connector extends between the rear edge of the front fairing portion and the front edge of the rear fairing portion front, the flexible connector connecting the front and rear fairing portions to one another.

2. The fairing according to claim 1, wherein the flexible connector includes an elastomeric material.

3. The fairing according to claim 2, wherein the elastomeric material is in the form of a block.

4. The fairing according to claim 2, wherein the elastomeric material is in the form of a strip.

5. The fairing according to claim 1,
    wherein the fairing is fastened to the bogie with no degree of freedom,
    wherein the flexible connector extends over peripheral portions of the fairing.

6. The fairing according to claim 1,
    wherein the flexible connector further extends between a rear edge of each front wall section that faces a front edge of the rear wall section to thereby connect each front wall section to the rear wall section and thereby connect the front wall sections and the rear wall sections of the first and second side walls to one another.

7. The fairing according to claim 1, wherein the fairing is made from a rigid material.

8. The fairing according to claim 7, wherein the rigid material is metal or a composite material or Kevlar, or a high-strength glass or a transparent plastic material.

9. The fairing according to claim 1, wherein the fairing includes openings allowing elements of the bogie to pass through.

10. The fairing according to claim 1, wherein the flexible connector is fastened to the fairing with through fastening elements.

11. The fairing according to claim 1, wherein the flexible connector is fastened to the fairing by a gripping element.

12. An articulated railway vehicle, comprising:
first and second bodies articulated relative to one another,
a bogie on which the first and second bodies rest at least partially, and
a fairing of the bogie, comprising:
a bottom wall and side walls surrounding at least a lower part of the bogie, and
anchoring zones each fastenable to one end, respectively, of the first body and the second body, the first and second bodies resting at least partially on the bogie,
wherein the fairing is according to claim 1.

13. A fairing for a bogie of an articulated railway vehicle, comprising:
a bottom wall that extends along a first longitudinal axis (X3) that is parallel to a second longitudinal axis (X1) of the vehicle when the fairing is in a configuration mounted on the bogie, the bottom wall having a forward edge and an opposite rear edge, the bottom wall further having opposite first and second edges that extend in the first longitudinal axis (X3) of the bottom wall between the forward and rear edges of the bottom wall;
first and second side walls secured to the first and second edges of the bottom wall, the first and second side walls extending longitudinally parallel to the first longitudinal axis (X3) of the bottom wall, the first and second side walls able to surround at least a lower part of the bogie,
each of the first and second side walls having a forward wall section and a rear wall section, each forward wall section having a rear edge that faces a front edge of the rear wall section;
first and second anchoring zones that are fastenable to one end, respectively, of a first body and a second body of the articulated railway vehicle in a configuration where the first and second bodies rest at least partially on the bogie, the first and second bodies being articulated relative to one another; and
a flexible connector connecting the rear edge of each forward wall section to the facing front edge of the rear wall section to mechanically link the rear edge of each forward wall section to the facing front edge of the rear wall section to thereby link the first anchoring zone and the second anchoring zone, the flexible connector mechanically linking the rear edge of each forward wall section to the facing front edge of the rear wall section authorizing a movement of the first and second anchoring zones relative to one another.

14. The fairing according to claim 13,
wherein the bottom wall defines part of a central portion of the fairing, and
outer parts of the first and second side walls respectively define first and second peripheral portions of the fairing,
wherein the first and second anchoring zones are arranged on the first and second peripheral portions, and
wherein the flexible connector extends longitudinally between the central portion and each of the first and second peripheral portions and connects the central portion to each of the first and second peripheral portions.

15. The fairing according to claim 13, wherein the flexible connector includes an elastomeric material.

16. The fairing according to claim 13, wherein the fairing is made from a rigid material.

17. The fairing according to claim 16, wherein the rigid material is metal or a composite material or Kevlar, or a high-strength glass or a transparent plastic material.

18. The fairing according to claim 13, wherein the fairing includes openings allowing elements of the bogie to pass through.

* * * * *